DIGITAL TO ANALOG CONVERTER

Filed Feb. 10, 1960 2 Sheets-Sheet 1

INVENTOR.
PAUL M. LEVY

BY H. A. Mackey

ATTORNEY.

Aug. 28, 1962 P. M. LEVY 3,051,938

DIGITAL TO ANALOG CONVERTER

Filed Feb. 10, 1960 2 Sheets-Sheet 2

INVENTOR.
PAUL M. LEVY

BY H. L. Mackey

ATTORNEY.

United States Patent Office 3,051,938

Patented Aug. 28, 1962

3,051,938

DIGITAL TO ANALOG CONVERTER

Paul M. Levy, Yonkers, N.Y., assignor to General Precision, Inc., a corporation of Delaware Filed Feb. 10, 1960, Ser. No. 7,808

5 Claims. (Cl. 340—347)

This invention relates to devices for converting a number representation presented in serial digital code to an analog representation.

The present invention converts a time series of signals in any digital code as, for example, the natural binary code, to a single signal having a characteristic representing the value of the time series of signals. The invention does this in a simple manner, and is distinguished from other methods by not requiring translation of the serial code into parallel code as a preliminary step.

The invention employs an aggregating device consisting of a number of AND logic circuits acting as gates, a computing or weighting resistor network, and an integrator. This device receives a time series of pulses constituting a digital serial code word, and emits a single voltage having an amplitude representing the value of the word. The gates are operated or "enabled" in time sequence by an N-stage ring counter operated by a clock pulse train.

The word "enable" as used herein in connection with gate circuits, AND circuits, or the like, means to so change the internal condition of the circuit by application of a potential to one input that the circuit becomes able to emit a potential if and when a potential is applied to another input.

The invention thus has for its purpose the provision of an improved converter for translating binary digital serial signals to analog signals.

Figure 1:
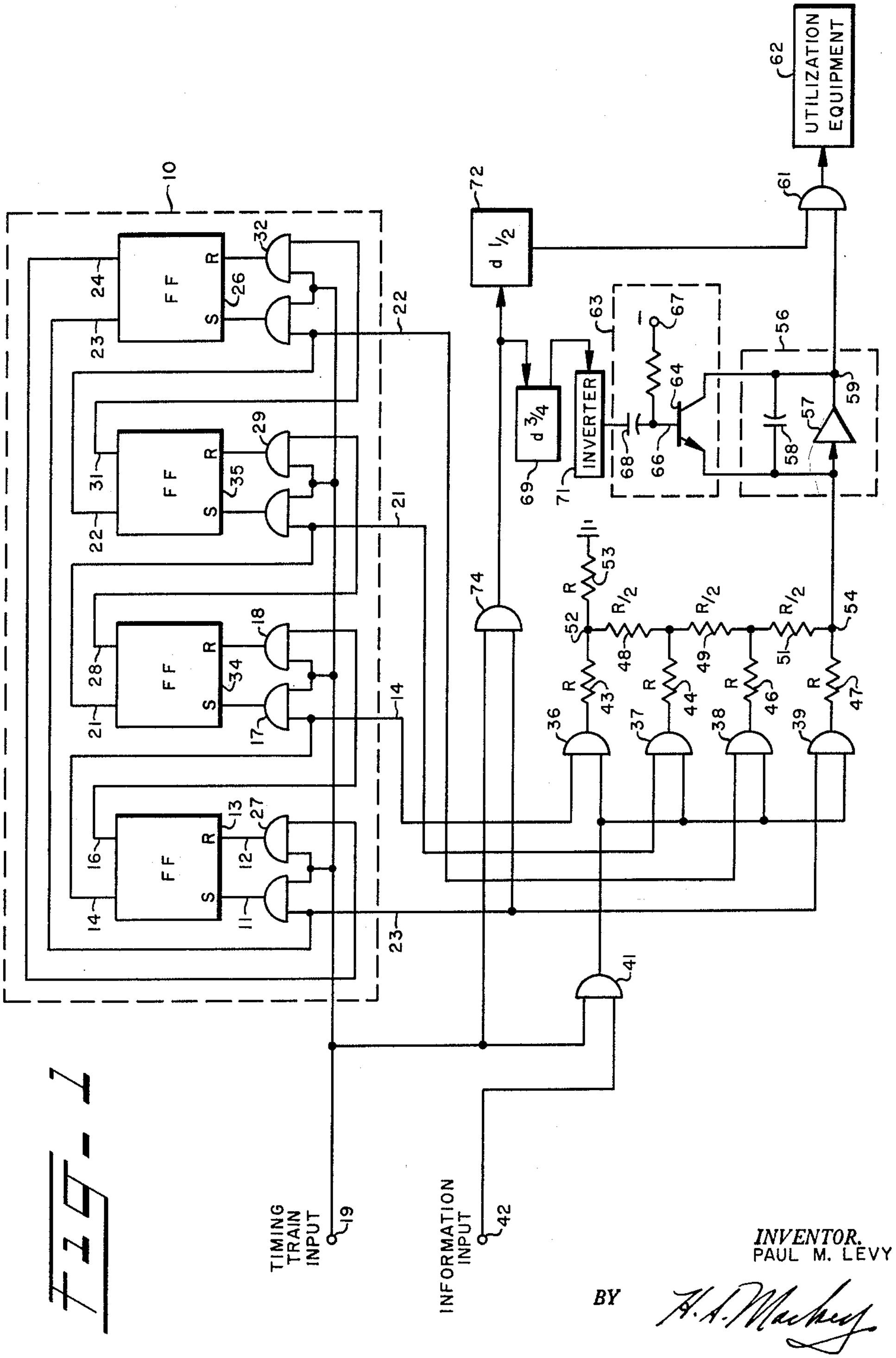

A further understanding of this invention may be secured from the detailed description and drawings, in which:

FIGURE 1 is the schematic circuit of an embodiment of the invention.

Figure 2:
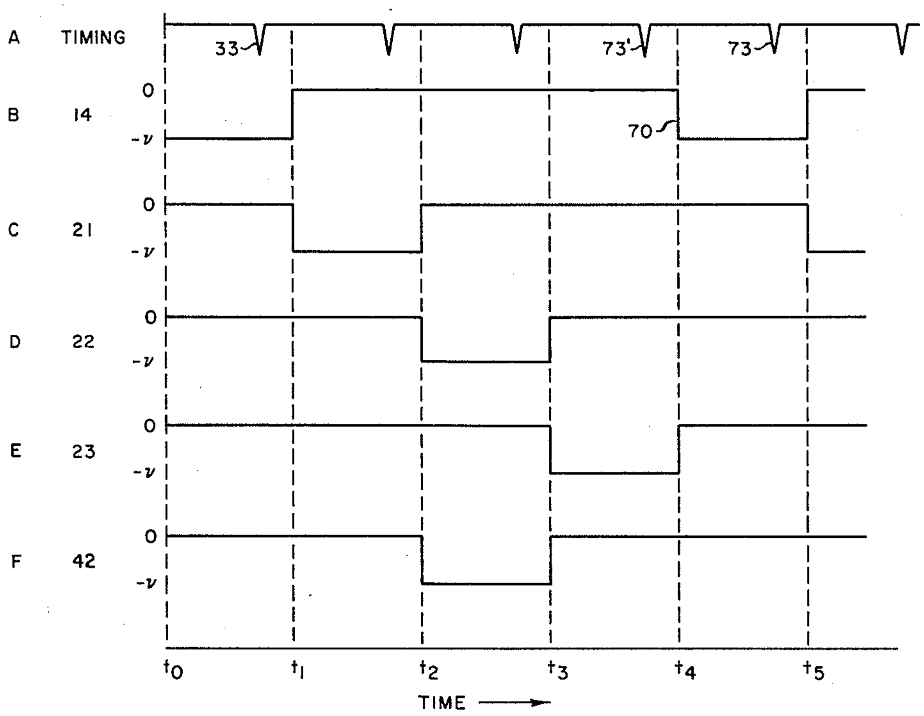

FIGURE 2 presents a series of graphs illustrating the operation of the invention.

Referring now to FIGURE 1, an N-stage ring counter 10 comprises four identical flip-flop stages (for the case N=4), similarly connected to form a closed ring. Each stage consists of a flip-flop component and two AND circuits. Each flip-flop has a set and a reset terminal, such as terminals 11 and 12 of flip-flop 13, and two output terminals such as 14 and 16. The outputs of the AND circuits are respectively connected to the set and reset flip-flop terminals. The four flip-flop stages are interconnected to form a ring, the outputs of one flip-flop being connected to AND circuit inputs of the next stage. The outputs of the fourth stage are connected back to the inputs of the first. For example, output 14 of the first flip-flop 13 is connected to one of the two inputs of AND circuit 17 of the second stage, and output 16 is connected to one of the two inputs of AND circuit 18 of the second stage. The second inputs of all AND circuits are connected together and to a timing train input terminal 19. The N-stage ring counter has four outputs, one from each of the four flip-flops, designated 14, 21, 22 and 23.

In the operation of a flip-flop, a negative pulse applied to a set input, such as input 11, causes negative potential to appear on one output, such as output 14, and causes effectively zero potential at the other, such as output 16. When an input negative pulse is applied to the reset input, such as input 12, the outputs are reversed, negative potential appearing on output 16. It is conventional for a delay to be built into each flip-flop so that the output voltage change follows the input pulse by, in this example, 2 μs. Such a delay may alternatively be effected by delay circuits inserted at each set and reset input.

In the operation of the N-stage ring counter 10, let it be assumed that a train of equal negative timing or clock pulses is applied to terminal 19 at a frequency of 100 kc.p.s. and with a pulse duration of 1 μs. This train is shown at A in FIGURE 2. Also assume that initially the first counter stage is set to emit negative potential at output 14 and that the three other stages are reset to emit zero potential at their corresponding outputs 21, 22 and 23. These output potentials are shown at time $t_0$ in FIGURE 2. Terminal 24 of flip-flop 26 applies negative potential to AND circuit 27 and thus "enables" it, or prepares it for transmission when its other input is activated. Similarly output 14 enables AND circuit 17, output 28 enables AND circuit 29, and output 31 enables AND circuit 32.

Upon reception at terminal 19 of the first timing pulse 33, FIGURE 2A, the AND circuits 27, 17, 29 and 32, having been enabled, transmit it to their respective flip-flops, causing negative potential to appear at output terminals 16, 21, 31 and 24. Thus some time after the first timing pulse, 33, a negative potential will appear at terminal conductor 21, and the potential at terminal conductor 14 will change to zero. The potentials at terminals 22 and 23, being zero already, are not affected. Each consecutive timing pulse moves the negative potential output of the counter to the next stage, restoring or keeping the other potentials at zero. Clock pulse 73 repeats the operation effected by the clock pulse 33 just preceding time $t_1$. The output voltage cycles of the four flip-flop stages are shown by graphs B, C, D and E, FIGURE 2.

The output conductors 14, 21, 22 and 23 of the four flip-flop circuits 13, 34, 35 and 26 are connected respectively to inputs of four AND circuits, 36, 37, 38 and 39, which gate the inputs connected to a weighting resistor network. The first flip-flop output, 14, is connected to the first AND circuit, 36, and the other flip-flop outputs are similarily connected in sequence. Each AND circuit has two input terminals. Those input terminals not connected to the ring counter are connected in parallel and additionally to the output of an AND circuit 41. One input of this AND circuit is connected to the timing train terminal 19 and the other input, 42, constitutes the information signal input of the digital to analog converter.

The AND circuit outputs are connected to four equal resistors 43, 44, 46 and 47, each having the resitance R. They are joined at their other terminals by three equal resistors 48, 49 and 51, each having the resistance $R/2$. The network is grounded at terminal 52 through a resistor 53 of resistance R. The terminal 54 constitutes the network output.

The function of this network is to weight the outputs of the AND circuits applied to it in the ratios of powers of 2 and to deliver a weighted current output at the output terminal 54. In such a circuit the instantaneous current $I_s$, at the output terminal is $$I_s=\frac{E}{R/2}\left[\frac{p_1}{2}+\frac{p_2}{4}+\frac{p_3}{8}+\frac{p_4}{16}\right] \qquad (1)$$

in which E is the voltage output of any AND circuit, and $p_1$, $p_2$, $p_3$, and $p_4$ each represent the AND circuit outputs, having a value of 1 if the AND circuit has a negative voltage output, representing logical 1, and having a value of 0 if the AND circuit has a zero voltage output, representing logical 0.

The terminal 54 is connected to the input of a current integrator 56. As an example of a simple form of integrator there is presented a high gain amplifier 57 shunted by a capacitor 58. The integrator output terminal 59 is connected to one of the two inputs of an AND circuit 61. The output of this AND circuit is connected to utilization equipment 62.

An electronic switch 63 is connected across the capacitor 58 for the purpose of discharging it at the end of each logical word or group of four pulses or bits of information. This switch 63 conveniently may consist of an NPN transistor 64 having its emitter connected to one terminal 54 of capacitor 58, its collector connected to the other terminal 59 of the capacitor, and its base connected through a resistor to a negative source 67. The base 66 is also coupled through a capacitor 68, an inverter 71 and a delay circuit 69 having a delay of three-quarters of a clock period to the output conductor of an AND circuit 74. The two inputs of this AND circuit 74 are connected to conductor 23 and the timing input terminal 19.

The second input of AND circuit 61 is connected through a delay circuit 72 having a delay of one-half of a clock period to the output of AND circuit 74.

In the operation of the electronic switch 63, in the absence of a pulse through capacitor 68 the base 66 is kept negative, so that the emitter-collector impedance is very high. When, however a positive pulse is applied to the base 66 the transistor becomes highly conductive, short-circuiting the capacitor 58 and discharging it.

In the operation of this digital-analog converter, let it be assumed that the information signals inserted at terminal 42 consists of consecutive 4-bit words in which a logical 1 is represented by negative potential for the duration of one clock period and a logical 0 by 0 potential during a clock period. The first bit of a word received represents the least significant digit. If, for example, the word 0100 is to be received, the most significant bit being written first, equivalent to the decimal number 4, it may be represented by the graph F, FIGURE 2. During the least significant bit time, $t_0$ to $t_1$, the input 42 is not energized so that, at the time of the first clock pulse 33 when AND circuit 36 is enabled, AND circuit 41 is not enabled, and the resistors 43, 44, 46 and 47 remain grounded through their AND circuits and the information input terminal. During the second period, $t_1$ to $t_2$, when AND circuit 37 is enabled, AND circuit 41 is again not enabled, and the resistor network remains grounded. During the third period, $t_2$ to $t_3$, when AND circuit 38 is enabled, AND circuit 41 is also enabled, so that a pulse of the shape and duration of a timing pulse is applied through resistor 46 and the weighting network to the integrator, where it charges the capacitor 58 to a selected potential. During the fourth period, $t_3$ to $t_4$ there again is no current through the weighting network. Since, however, in an active integrator, the output remains constant at its last altered value when the input is zero, the potential at terminal 59 remains at the level which it had attained by the end of the third bit period.

It is now desired, at or soon after the time $t_4$, to impress the then attained potential of terminal 59 on the utilization equipment 62. This is done by applying the timing train pulse 73', FIGURE 2, through AND circuit 74 and the ½ period delay 72, to the AND circuit 61, so that the potential is transmitted from terminal 59 to the utilization equipment 62. Shortly thereafter, at a time ¾ period after the pulse 73', the same pulse from AND circuit 74 is transmitted through the longer delay 69, inverter 71 and capacitor 68 to transistor 64, short circuiting the capacitor 58. The time constant associated with coupling capacitor 68 is so short that the short circuit is gone by the time of the next clock pulse 73.

Thus at the end of any logical word at the time $t_4$ the potential attained by the capacitor 58 will have a magnitude which is the analog equivalent of digital input.

What is claimed is:

1. A converter for converting a binary word containing N bits into an analog quantity comprising, an N-stage ring counter, an AND gating circuit for each one of the stages of said ring counter, each AND gating circuit having one of a pair of inputs connected to an output of a respective stage of said ring counter, timing means connected to said ring counter for generating output pulses in the outputs of respective stages thereof in time sequence whereby said AND gating circuits are enabled in sequence, means operated by said timing means for sequentially applying the bits of said binary word to all of the other of said pairs of inputs of said AND gating circuits, computing network means having the output of each of said AND gating circuits impressed on selected terminals thereof and producing a current the magnitude of which is determined by the order of significance of the AND gating circuits rendered conductive by the simultaneous application of signal pulses to the inputs thereof, an integrator connected to the output of said computing network means, and utilization means having the output of said integrator impressed thereon.

2. A converter for converting a binary word containing N bits into an analog quantity comprising, an N-stage ring counter, a counter AND gating circuit for each one of the stages of said ring counter, each counter AND gating circuit having one of a pair of inputs connected to an output of a respective stage of said ring counter, timing means applying a train of pulse signals to said ring counter for generating output pulses in the outputs of respective stages thereof in time sequence whereby said counter AND gating circuits are enabled in sequence, an input AND gating circuit conjointly operated by said timing signals and signal pulses representative of said binary word and having its output connected to all of the other of the pairs of inputs of said counter AND gating circuits, computing network means having the output of each of said counter AND gating circuits impressed on selected terminals thereof and producing therefrom output current pulses the magnitude of which is determined by the order of significance of the counter AND gating circuit rendered conductive by the simultaneous application of pulses to the inputs thereof, an integrator connected to the output of said computing network means, and utilization means having the output of said integrator impressed thereon.

3. A converter for converting a binary word containing N bits into an analog quantity comprising, an N-stage ring counter, a counter AND gating circuit for each one of the stages of said ring counter, each counter AND gating circuit having one of a pair of inputs connected to an output of a respective stage of said ring counter, timing means applying a train of pulse signals to said ring counter for generating output pulses in the outputs of respective stages thereof in time sequence whereby said counter AND gating circuits are enabled in sequence, an input AND gating circuit conjointly operated by said timing signals and signal pulses representative of said binary word and having its output connected to all of the other of the pairs of inputs of said counter AND gating circuits, computing network means having the output of each of said counter AND gating circuits impressed on selected terminals thereof and producing therefrom output current pulses the magnitude of which is determined by the order of significance of the counter AND gating circuit rendered conductive by the simultaneous application of pulses to the inputs thereof, an integrator connected to the output of said computing network means, utilization means, means including a first delay means operated by the output of the final stage of said ring counter for transferring the signal stored in said integrator to said utilization means, said first delay means introducing a delay of less than the period of said train of pulse signals, and means including second delay means operated by the output of said final stage of said ring counter for clearing the signal magnitude stored in said integrator, said second delay means introducing a delay greater than said first delay but still less than the period of said train of pulse signals.

4. A converter as set forth in claim 3 in which said integrator comprises an amplifier having a capacitor connected between its input and output and said clearing means includes an electronic switch for discharging said capacitor on the receipt of the delayed output from the last stage of said ring counter.

5. A digit-analog converter comprising, resistive network means having a plurality of inputs and a single output for converting pulse signals applied to the inputs thereof into pulse signals at the output the amplitudes of which are geometrically related to each other and depend on the particular input to which a respective signal is applied, timing means for successively applying successive binary digits of a binary serial code signal to succesive ones of said inputs, and integrating means integrating the output of said resistive network means.

References Cited in the file of this patent

UNITED STATES PATENTS

| | | |
|---|---|---|
| 2,447,024 | Metcalf | Aug. 17, 1948 |
| 2,718,634 | Hansen | Sept. 20, 1955 |
| 2,907,021 | Woods | Sept. 29, 1959 |
| 2,933,364 | Campbell | Apr. 19, 1960 |

OTHER REFERENCES

Rigby: "Electronics," January 1956, p. 152.